(12) United States Patent
Kim et al.

(10) Patent No.: US 10,435,010 B2
(45) Date of Patent: *Oct. 8, 2019

(54) METHOD AND APPARATUS OF CONTROLLING VIBRATION FOR HYBRID ELECTRIC VEHICLE

(71) Applicants: Hyundai Motor Company, Seoul (KR); KIA Motors Corporation, Seoul (KR)

(72) Inventors: Sung Jae Kim, Suwon-si (KR); Jeong Soo Eo, Hwaseong-si (KR)

(73) Assignees: HYUNDAI MOTOR COMPANY, Seoul (KR); KIA Motors Corporation, Seoul (KR)

(*) Notice: Subject to any disclaimer, the term of this patent is extended or adjusted under 35 U.S.C. 154(b) by 90 days.

This patent is subject to a terminal disclaimer.

(21) Appl. No.: 15/833,283

(22) Filed: Dec. 6, 2017

(65) Prior Publication Data
US 2018/0162366 A1  Jun. 14, 2018

(30) Foreign Application Priority Data
Dec. 13, 2016 (KR) .................. 10-2016-0169479

(51) Int. Cl.
*B60W 20/00* (2016.01)
*B60W 10/00* (2006.01)
(Continued)

(52) U.S. Cl.
CPC ............ *B60W 20/15* (2016.01); *B60K 6/442* (2013.01); *B60W 10/08* (2013.01); *B60W 30/20* (2013.01); *B60W 2030/206* (2013.01);
*B60W 2050/0057* (2013.01); *B60W 2510/0628* (2013.01); *B60W 2510/0638* (2013.01); *B60W 2520/10* (2013.01);
(Continued)

(58) Field of Classification Search
CPC ...... B60W 10/00; B60W 20/00; B60W 30/00; B60W 40/00; B60W 50/00; B60K 6/48
See application file for complete search history.

(56) References Cited

U.S. PATENT DOCUMENTS 7,633,257 B2   12/2009  Sakamoto et al.
9,758,157 B2 *  9/2017  Eo .................... B60W 20/17
(Continued)

FOREIGN PATENT DOCUMENTS

JP   07-133842 A    5/1995
JP   2008-024022 A  2/2008
(Continued)

*Primary Examiner* — Yonel Beaulieu
(74) *Attorney, Agent, or Firm* — McDonnell Boehnen Hulbert & Berghoff LLP

(57) ABSTRACT

Disclosed are a method of and an apparatus for controlling a vibration of a hybrid electric vehicle. An apparatus for controlling a vibration of a hybrid electric vehicle may include: an engine position detector detecting a position of an engine; an air amount detector detecting an air amount flowing into the engine; an accelerator pedal position detector detecting a position of an accelerator pedal; a vehicle speed detector detecting a speed of the hybrid electric vehicle; and a controller. The controller controls operation of a motor based on the position of the engine, the air amount, the position of the accelerator pedal, and the speed of the hybrid electric vehicle.

20 Claims, 12 Drawing Sheets

(51) Int. Cl.
  *B60W 30/00*  (2006.01)
  *B60W 40/00*  (2006.01)
  *B60K 6/48*  (2007.10)
  *B60W 20/15*  (2016.01)
  *B60W 30/20*  (2006.01)
  *B60W 10/08*  (2006.01)
  *B60K 6/442*  (2007.10)
  *B60W 50/00*  (2006.01)

(52) U.S. Cl.
  CPC ... *B60W 2540/10* (2013.01); *B60W 2710/083* (2013.01); *Y02T 10/6234* (2013.01)

(56) References Cited

U.S. PATENT DOCUMENTS

| | | | | |
|---|---|---|---|---|
| 9,981,652 | B2* | 5/2018 | Kim | B60W 20/15 |
| 10,040,444 | B2* | 8/2018 | Eo | B60W 20/17 |
| 10,259,463 | B2* | 4/2019 | Kim | B60K 6/48 |
| 10,266,171 | B2* | 4/2019 | Kim | B60W 20/17 |
| 10,272,904 | B2* | 4/2019 | Eo | B60K 6/485 |
| 2017/0166190 | A1* | 6/2017 | Eo | B60W 20/17 |
| 2018/0105160 | A1* | 4/2018 | Yang | B60W 20/15 |

FOREIGN PATENT DOCUMENTS

| | | |
|---|---|---|
| JP | 2014-217215 A | 11/2014 |
| KR | 10-2010-0064603 A | 6/2010 |
| KR | 10-1619663 | 5/2016 |

\* cited by examiner

METHOD AND APPARATUS OF CONTROLLING VIBRATION FOR HYBRID ELECTRIC VEHICLE

CROSS-REFERENCE TO RELATED APPLICATION

This application claims priority to and the benefit of Korean Patent Application No. 10-2016-0169479 filed in the Korean Intellectual Property Office on Dec. 13, 2016, the entire contents of which are incorporated herein by reference.

BACKGROUND OF THE DISCLOSURE

(a) Field of the Disclosure

The present disclosure relates to a method of and an apparatus for controlling a vibration of a hybrid electric vehicle.

(b) Description of the Related Art

As is generally known in the art, a hybrid electric vehicle (HEV) uses an internal combustion engine and a battery power source together. In other words, the hybrid electric vehicle efficiently combines and uses power of the internal combustion engine and power of a driving motor. Since the hybrid electric vehicle uses both mechanical energy of the engine and electrical energy of the battery, uses optimal operation regions of the engine and the driving motor, and recovers energy upon braking, fuel efficiency may be improved and the energy may be efficiently used.

The hybrid electric vehicle provides driving in an electric vehicle (EV) mode in which only torque of the driving motor is used; a hybrid electric vehicle (HEV) mode in which torque of the engine is used as main torque and torque of the driving motor is used as auxiliary torque; and a regenerative braking mode in which braking and inertial energy are recovered through electrical power generation of the driving motor during braking of the vehicle or during deceleration of the vehicle by inertia to be charged in the battery.

A vibration may be caused in a power system of the hybrid electric vehicle due to several factors, and a vibration component is mostly extracted using a frequency analysis method. In conventional frequency analysis, an analog method using a bandpass filter has been used, and in this method, a vibration component is extracted based on a magnitude of each point in a frequency band. However, a unique vibration component of an engine and a noise component are not clearly divided, and excessive vibration suppression control may have a negative influence on control efficiency and energy management. Further, because a reference signal is generated only in a specific frequency component and only a synchronization signal synchronized with a vibration signal corresponding to the specific frequency component is generated based on the reference signal, active vibration control of other frequency components that may be additionally caused cannot be performed.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a method of and an apparatus for controlling a vibration of a hybrid electric vehicle having advantages of being capable of efficiently controlling a vibration by reducing a calculation load of a controller and by selecting a control target frequency using Walsh-based Discrete Fourier Transform (WDFT).

A method of controlling a vibration of a hybrid electric vehicle according to an exemplary embodiment of the present disclosure may include: calculating an engine speed based on a position of an engine; setting a reference angle based on the position of the engine; setting a window for performing Walsh-based Discrete Fourier Transform (WDFT) based on the reference angle; calculating a magnitude spectrum and a phase spectrum by performing the WDFT based on the engine speed, the reference angle, and the window; selecting a control target frequency based on the magnitude spectrum; compensating a magnitude of the control target frequency by applying a scale factor to the control target frequency; generating a reference signal based on the magnitude and a phase of the control target frequency; determining a magnitude ratio of the reference signal based on the engine speed and an engine load; calculating a command torque by applying the magnitude ratio and an engine torque to the reference signal; calculating an inverse phase torque of the command torque; correcting the inverse phase torque based on an acceleration of the engine when the acceleration of the engine is less than a predetermined acceleration; and controlling operation of a motor to generate the corrected inverse phase torque.

The correcting of the inverse phase torque may include decreasing the inverse phase torque by applying a predetermined offset to the inverse phase torque when the acceleration of the engine is less than the predetermined acceleration.

The selecting of the control target frequency may include: setting a reference spectrum based on the engine speed and the engine load; and selecting the control target frequency by comparing the reference spectrum and the magnitude spectrum.

The reference spectrum may be a set of reference values at each frequency, and a specific frequency may be selected as the control target frequency when a magnitude corresponding to the specific frequency is greater than the reference value corresponding to the specific frequency.

The magnitude of the control target frequency may be compensated by applying a scale factor to the control target frequency.

The generating of the reference signal may include performing Inverse Walsh-based Discrete Fourier Transform (IWDFT) based on the magnitude and a phase of the control target frequency.

The method may further include compensating the phase of the control target frequency by applying a compensation phase to the phase of the control target frequency.

The window may be determined according to the number of cylinders and the number of strokes of the engine.

The engine load may be calculated based on an air amount flowing into the engine.

The engine torque may be calculated based on a position of an accelerator pedal and a speed of the hybrid electric vehicle.

The engine may be a two-cylinder four-stroke engine.

A method of controlling a vibration of a hybrid electric vehicle according to another exemplary embodiment of the present disclosure may include: calculating a motor speed based on a position of a motor; setting a reference angle based on the position of the motor; setting a window for performing Walsh-based Discrete Fourier Transform (WDFT) based on the reference angle; calculating a magnitude spectrum and a phase spectrum by performing the WDFT based on the motor speed, the reference angle, and the window; selecting a control target frequency based on the magnitude spectrum; compensating a magnitude of the control target frequency by applying a scale factor to the control target frequency; generating a reference signal by performing Inverse Walsh-based Discrete Fourier Transform (IWDFT) based on the magnitude and a phase of the control target frequency; determining a magnitude ratio of the reference signal based on an engine speed and an engine load; calculating a command torque by applying the magnitude ratio and an engine torque to the reference signal; calculating an inverse phase torque of the command torque; correcting the inverse phase torque based on an acceleration of the engine when the acceleration of the engine is less than a predetermined acceleration; and controlling operation of a motor to generate the corrected inverse phase torque.

The correcting of the inverse phase torque may include decreasing the inverse phase torque by applying a predetermined offset to the inverse phase torque when the acceleration of the engine is less than the predetermined acceleration.

The selecting of the control target frequency may include: setting a reference spectrum based on the engine speed and the engine load; and selecting the control target frequency by comparing the reference spectrum and the magnitude spectrum.

The reference spectrum may be a set of reference values at each frequency, and a specific frequency may be selected as the control target frequency when a magnitude corresponding to the specific frequency is greater than the reference value corresponding to the specific frequency.

The method may further include compensating the phase of the control target frequency by applying a compensation phase to the phase of the control target frequency.

The window may be determined according to the number of cylinders and the number of strokes of the engine.

The engine load may be calculated based on an air amount flowing into the engine.

The engine torque may be calculated based on a position of an accelerator pedal and a speed of the hybrid electric vehicle.

The engine may be a two-cylinder four-stroke engine.

According to an exemplary embodiment of the present disclosure, a calculation load of a controller may be reduced using Walsh-based Discrete Fourier Transform (WDFT). In addition, by selecting a control target frequency, efficient vibration control may be performed. Further, an inverse phase torque is decreased by applying a predetermined offset to the inverse phase torque when an engine is in a deceleration state, thereby improving energy efficiency of the hybrid electric vehicle.

DETAILED DESCRIPTION OF THE EMBODIMENTS

Figure 1:
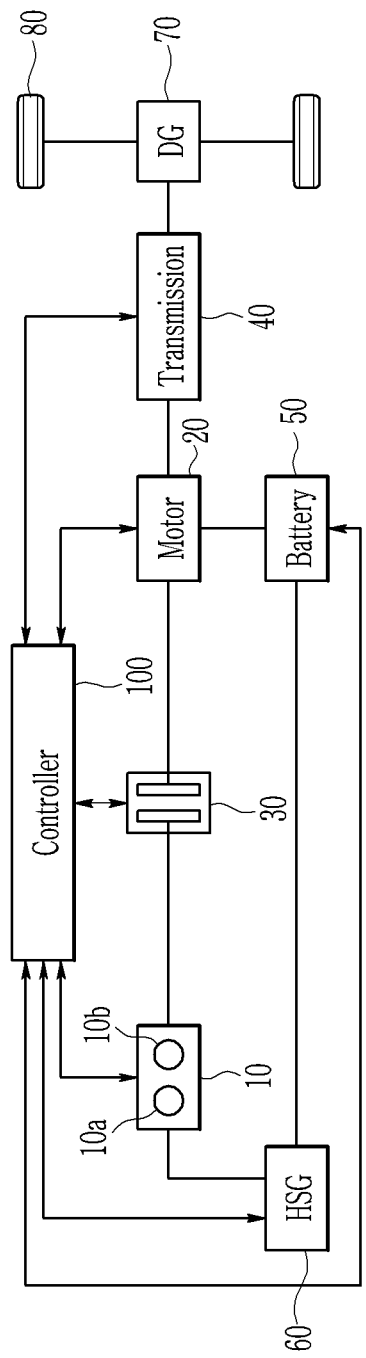
FIG. 1 is a block diagram illustrating a hybrid electric vehicle according to an exemplary embodiment of the present disclosure.

Hereinafter, the present disclosure will be described more fully with reference to the accompanying drawings, in which exemplary embodiments of the disclosure are shown. However, the present disclosure is not limited to the exemplary embodiments described herein, and may be modified in various different ways.

The drawings and description are to be regarded as illustrative in nature and not restrictive. Like reference numerals designate like elements throughout the specification.

The configurations illustrated in the drawings are arbitrarily shown for better understanding and ease of description, but the present disclosure is not limited thereto.

FIG. 1 is a block diagram illustrating a hybrid electric vehicle according to an exemplary embodiment of the present disclosure.

As shown in FIG. 1, a hybrid electric vehicle according to an exemplary embodiment of the present disclosure includes an engine 10, a motor 20, an engine clutch 30, a transmission 40, a battery 50, a hybrid starter & generator (HSG) 60, a differential gear device 70, a wheel 80, and a controller 100.

The engine 10 combusts a fuel to generate torque, and various engines such as a gasoline engine and a diesel engine may be used as the engine 10. The engine 10 may be a two-cylinder four-stroke engine. In a two-cylinder engine, by reducing a size of the engine 10, fuel consumption may be enhanced, but because the two-cylinder engine has a problem in that vibration is excessive, a method of controlling vibration according to an exemplary embodiment of the present disclosure to be described below may be performed.

The motor 20 is disposed between the transmission 40 and the battery 50 and generates torque using electricity of the battery 50.

The engine clutch 30 is disposed between the engine 10 and the motor 20 and selectively connects the engine 10 to the motor 20.

The hybrid electric vehicle provides driving in an electric vehicle (EV) mode in which only torque of the motor 20 is used, a hybrid electric vehicle (HEV) mode in which torque of the engine 10 is used as main torque and torque of the motor 20 is used as auxiliary torque, and a regenerative braking mode in which braking and inertial energy are recovered through electrical power generation of the motor 20 during braking of the vehicle or during deceleration of the vehicle by inertia to be charged in the battery 50.

For torque transmission of the hybrid electric vehicle, torque generated by the engine 10 and/or the motor 20 is transmitted to an input shaft of the transmission 40, and torque output from an output shaft of the transmission 40 is transmitted to an axle via the differential gear device 70. The axle rotates the wheel 80 such that the hybrid electric vehicle runs by the torque generated by the engine 10 and/or the motor 20.

The battery 50 may supply electricity to the motor 20 in the EV mode and the HEV mode, and may be charged with electricity recovered through the motor 20 in the regenerative braking mode.

The HSG 60 may start the engine 10 or generate electricity according to an output of the engine 10.

The controller 100 controls operations of the engine 10, the motor 20, the engine clutch 30, the transmission 40, the battery 50, and the HSG 60. The controller 100 may be implemented with at least one processor executed by a predetermined program. The predetermined program may include a series of commands for performing each step included in a method of controlling a vibration of a hybrid electric vehicle according to an exemplary embodiment of the present disclosure to be described below.

The above-described hybrid electric vehicle is one example to which the spirit of the present disclosure may be applied, and the spirit of the present disclosure may be applied to various hybrid electric vehicles as well as the hybrid electric vehicle shown in FIG. 1.

Figure 2:
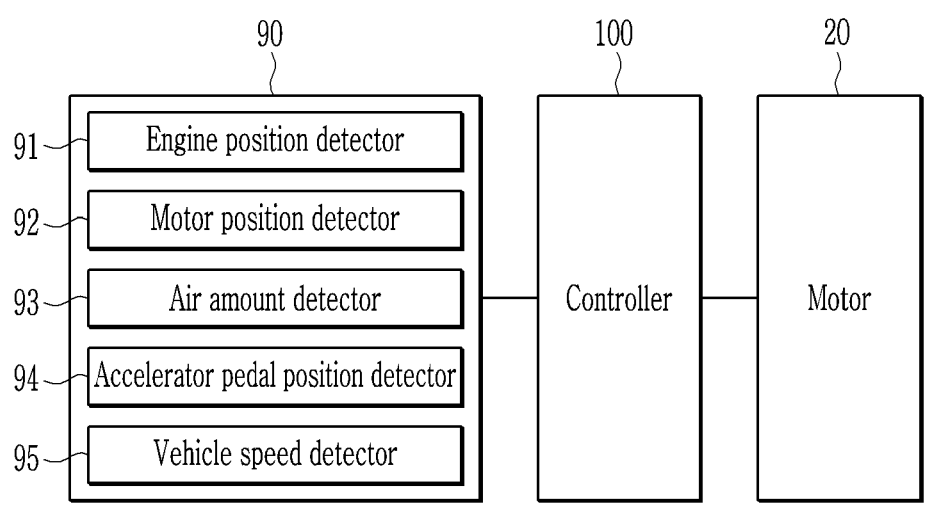
FIG. 2 is a block diagram illustrating an apparatus for controlling a vibration of a hybrid electric vehicle according to an exemplary embodiment of the present disclosure.

FIG. 2 is a block diagram illustrating an apparatus for controlling a vibration of a hybrid electric vehicle according to an exemplary embodiment of the present disclosure.

As shown in FIG. 2, an apparatus for controlling a vibration of a hybrid electric vehicle according to an exemplary embodiment of the present disclosure may include a data detector 90, the controller 100, and the motor 20.

The data detector 90 may include an engine position detector 91, a motor position detector 92, an air amount detector 93, an accelerator pedal position detector 94, and a vehicle speed detector 95. The data detector 90 may further include other detectors (e.g., a brake pedal position detector and the like) for controlling the hybrid electric vehicle.

The engine position detector 91 detects a position of the engine 10 and transmits a signal corresponding thereto to the controller 100. The engine position detector 91 may be a crankshaft position sensor that detects a rotational angle of a crankshaft of the engine 10. The controller 100 may calculate an engine speed based on the position of the engine 10.

The motor position detector 92 detects a position of the motor 20 and transmits a signal corresponding thereto to the controller 100. The motor position detector 92 may be a resolver that detects a rotational angle of a rotor of the motor 20. The controller 100 may calculate a motor speed based on the position of the motor 20.

The air amount detector 93 detects an air amount flowing into the engine 10 and transmits a signal corresponding thereto to the controller 100. The controller 100 may calculate an engine load based on the air amount.

The accelerator pedal position detector 94 detects a position of an accelerator pedal (i.e., a pushed degree of the accelerator pedal) and transmits a signal corresponding thereto to the controller 100. When the accelerator pedal is pushed completely, the position of the accelerator pedal is 100%, and when the accelerator pedal is not pushed, the position of the accelerator pedal is 0%.

The vehicle speed detector 95 detects a speed of the hybrid electric vehicle and transmits a signal corresponding thereto to the controller 100. The controller 100 may calculate an engine torque based on the speed position of the accelerator pedal and the speed of the hybrid electric vehicle.

By controlling operation of the motor 20 based on the data detected by the data detector 90, the controller 100 may control a vibration of the engine 10.

Hereinafter, a method of controlling a vibration of a hybrid electric vehicle according to an exemplary embodiment of the present disclosure will be described in detail with reference to FIGS. 3 to 11.

Figure 3:
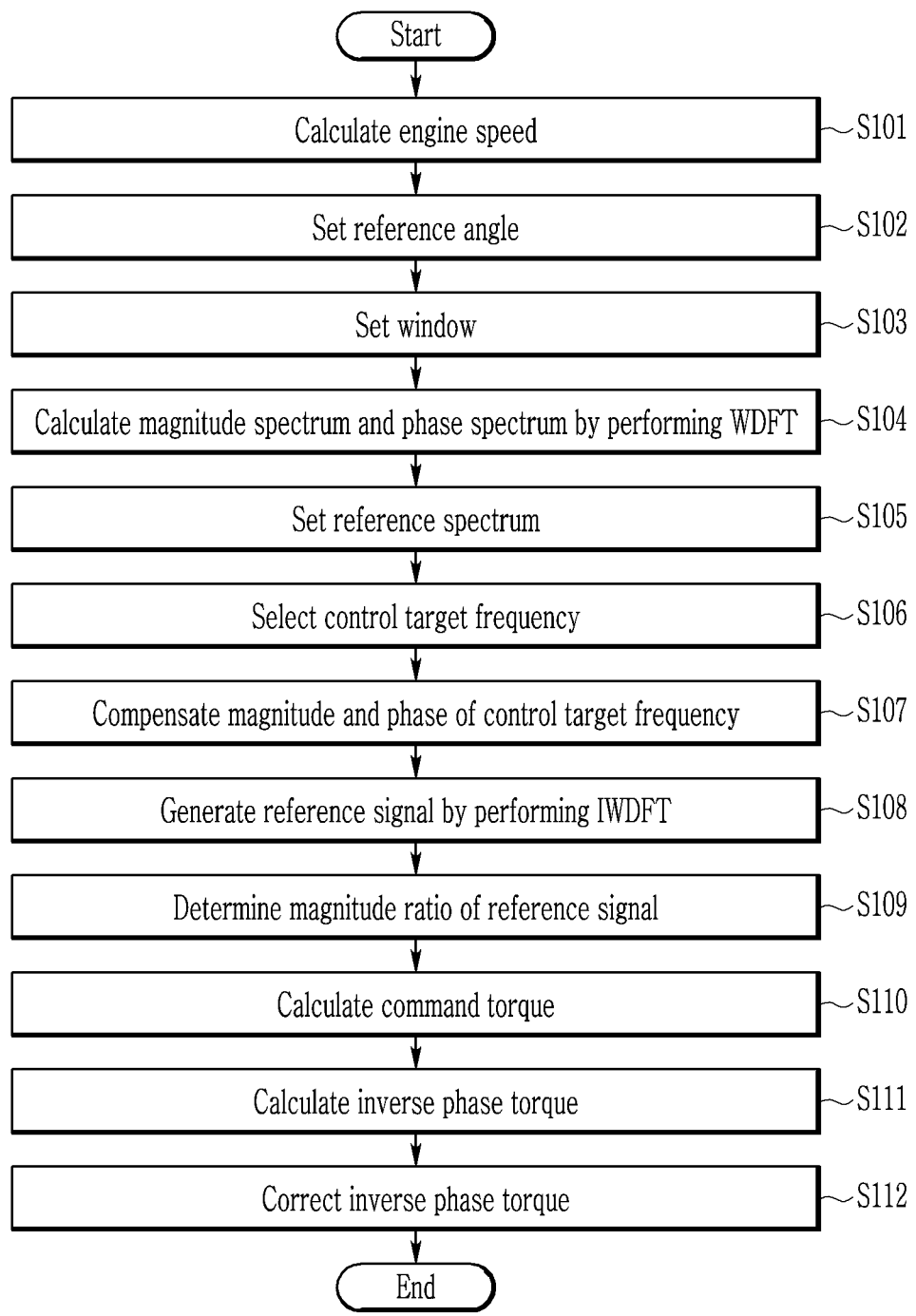
FIG. 3 is a flowchart illustrating a method of controlling a vibration of a hybrid electric vehicle according to an exemplary embodiment of the present disclosure.
Figure 4:
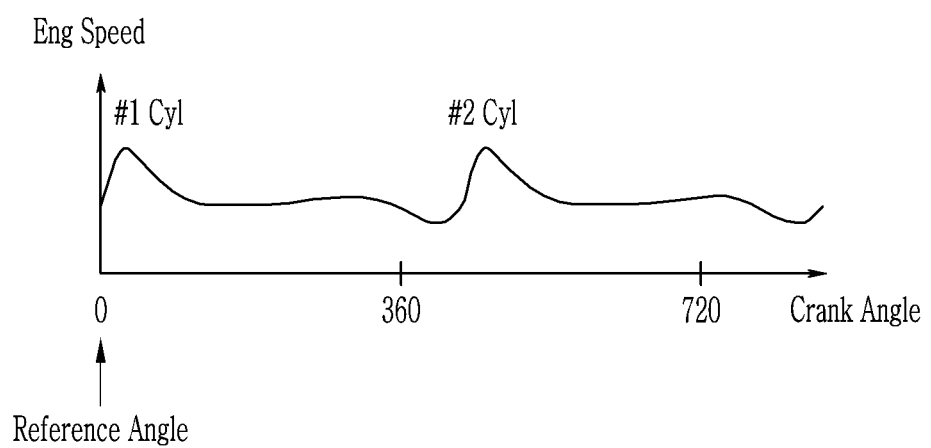
FIG. 4 is a graph illustrating a method of setting a reference angle and a window according to an exemplary embodiment of the present disclosure.
Figure 5:
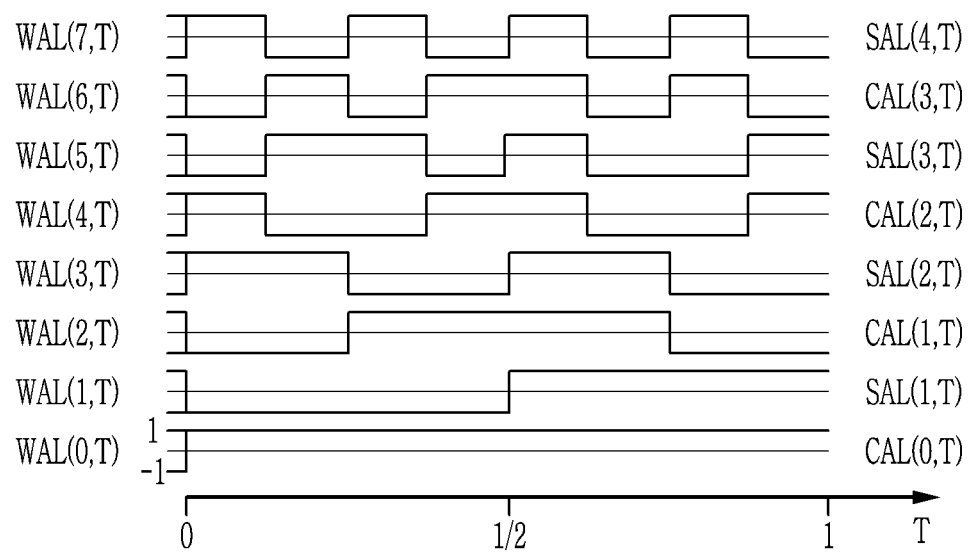
FIG. 5 is a graph illustrating a Walsh function according to an exemplary embodiment of the present disclosure.
Figure 6:
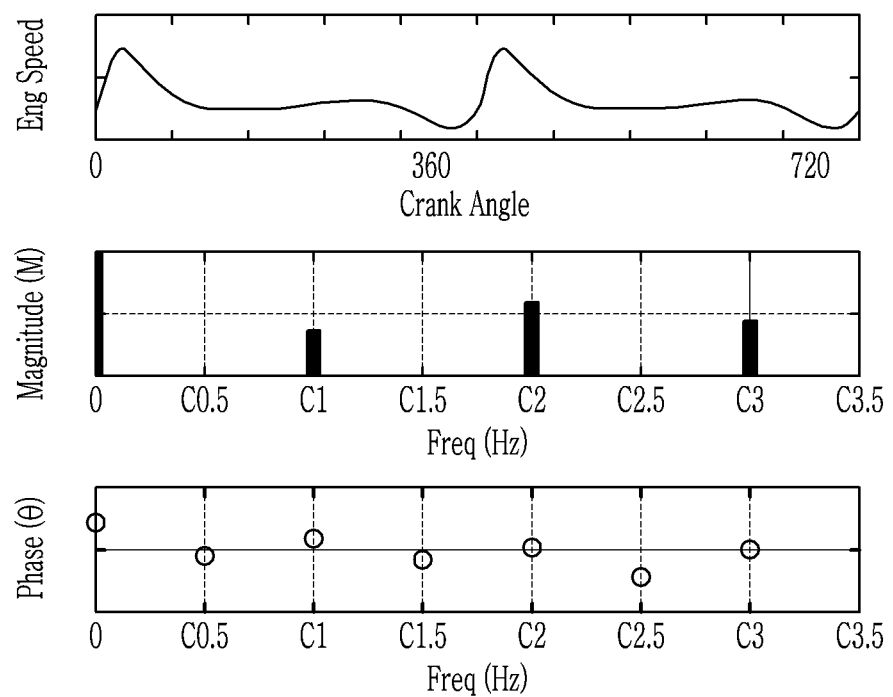
FIG. 6 is a graph illustrating a magnitude spectrum and a phase spectrum when Discrete Fourier Transform is performed.
Figure 7:
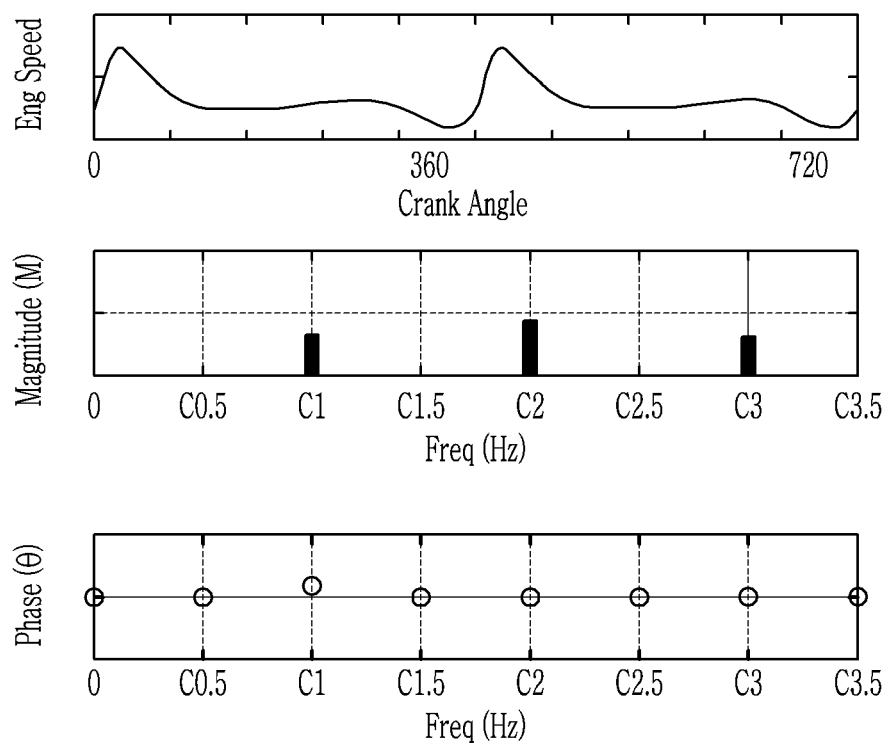
FIG. 7 is a graph illustrating a magnitude spectrum and a phase spectrum when a Walsh-based Discrete Fourier Transform is performed according to an exemplary embodiment of the present disclosure.
Figure 8:
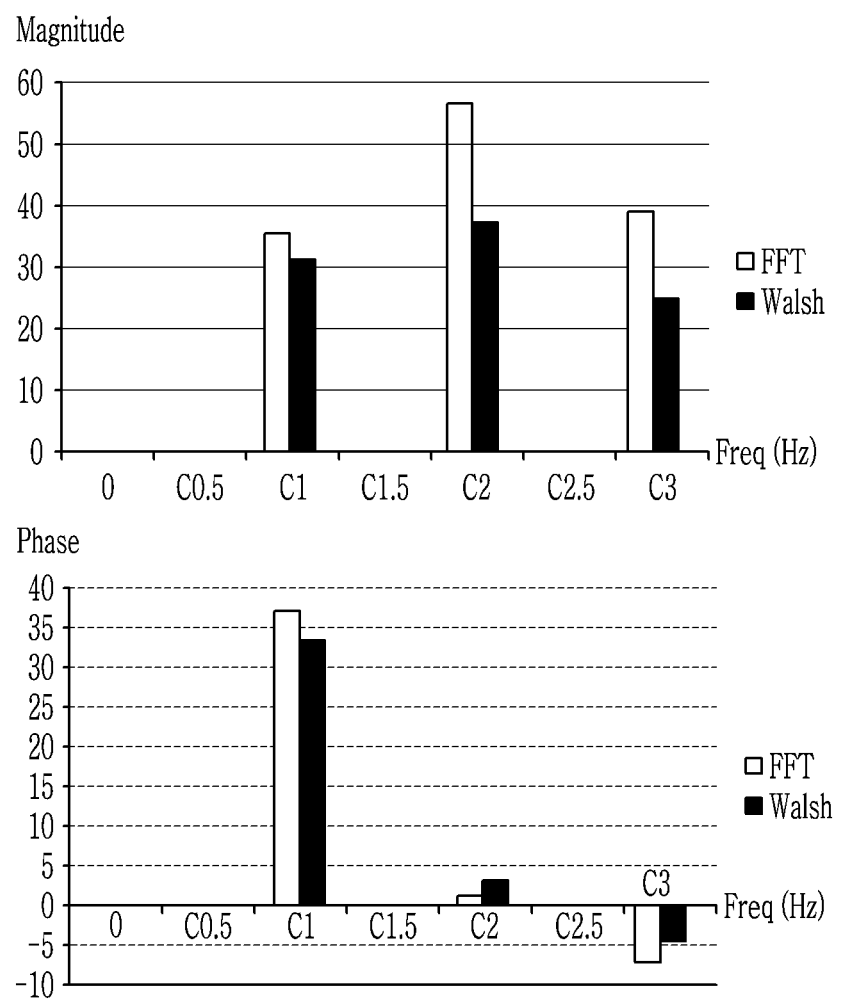
FIG. 8 is a graph illustrating comparing results obtained by performing a Walsh-based Discrete Transform and a Discrete Fourier Transform according to an exemplary embodiment of the present disclosure.
Figure 9:
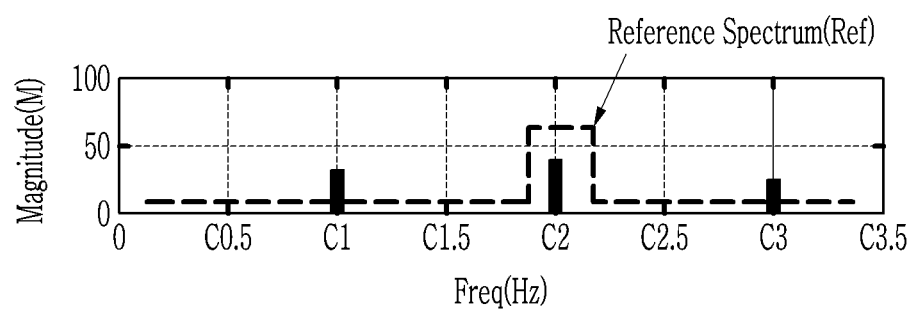
FIG. 9 is a graph illustrating a reference spectrum according to an exemplary embodiment of the present disclosure.
Figure 10:
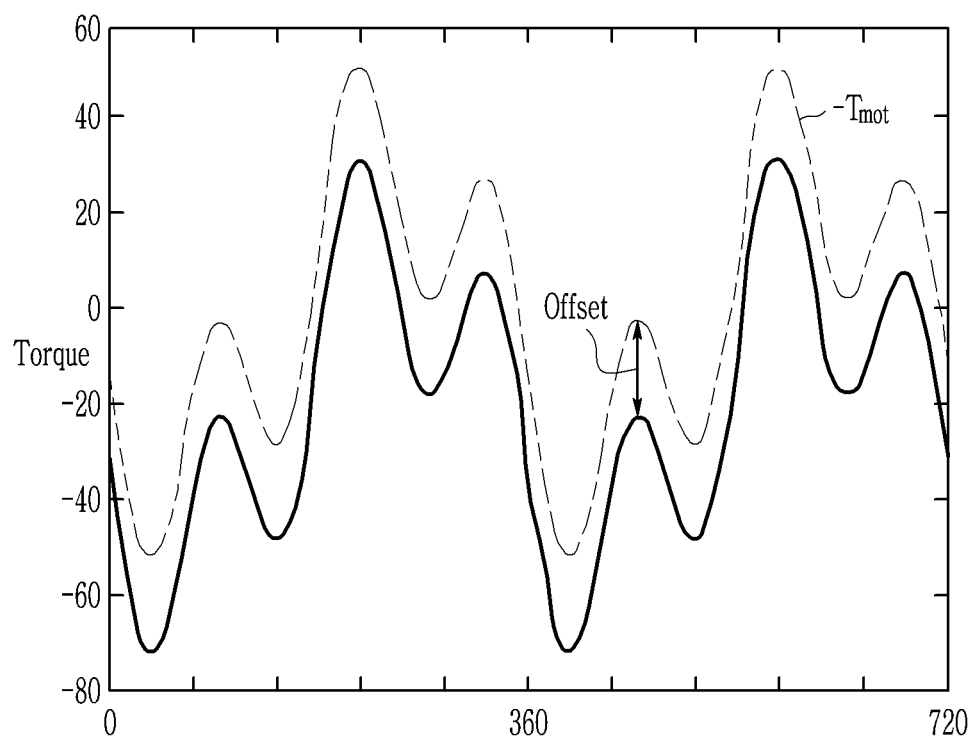
FIG. 10 is a graph illustrating an inverse phase torque according to an exemplary embodiment of the present disclosure.
Figure 11:
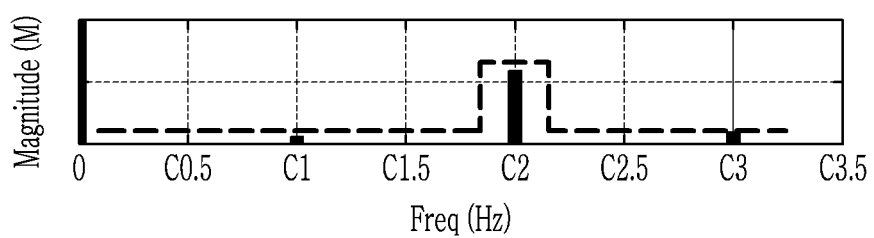
FIG. 11 is a graph illustrating a state in which a magnitude of a control target frequency is reduced according to an exemplary embodiment of the present disclosure.

FIG. 3 is a flowchart illustrating a method of controlling a vibration of a hybrid electric vehicle according to an exemplary embodiment of the present disclosure. FIG. 4 is a graph illustrating a method of setting a reference angle and a window according to an exemplary embodiment of the present disclosure. FIG. 5 is a graph illustrating a Walsh function according to an exemplary embodiment of the present disclosure. FIG. 6 is a graph illustrating a magnitude spectrum and a phase spectrum when Discrete Fourier Transform is performed. FIG. 7 is a graph illustrating a magnitude spectrum and a phase spectrum when a Walsh-based Discrete Fourier Transform is performed according to an exemplary embodiment of the present disclosure. FIG. 8 is a graph illustrating comparing results obtained by performing Walsh-based Discrete Transform and Discrete Fourier Transform according to an exemplary embodiment of the present disclosure. FIG. 9 is a graph illustrating a reference spectrum according to an exemplary embodiment of the present disclosure. FIG. 10 is a graph illustrating an inverse phase torque according to an exemplary embodiment of the present disclosure. FIG. 11 is a graph illustrating a state in which a magnitude of a control target frequency is reduced according to an exemplary embodiment of the present disclosure.

As shown in FIG. 3, the controller 100 calculates an engine speed based on a position of the engine 10 at step S101. The controller 100 may receive the position of the engine 10 detected by the engine position detector 91 and calculate the engine speed by differentiating the position of the engine 10. As shown in FIG. 4, when the engine 10 is a two-cylinder four-stroke engine, while the engine 10 rotates twice, an explosion occurs once in each cylinder.

The controller 100 sets a reference angle based on the position of the engine 10 at step S102. The reference angle means a start time point for performing Walsh-based Discrete Fourier Transform (WDFT) to be described below. For example, as shown in FIG. 4, the controller 100 may set an angle between top dead center (TDC) and bottom dead center (BDC) of a first cylinder 10a to the reference angle. Alternatively, an angle between top dead center (TDC) and bottom dead center (BDC) of a second cylinder 10b may be set to the reference angle.

The controller 100 sets a window for performing the WDFT based on the reference angle at step S103. The window may be determined according to specifications (e.g., the number of cylinders and the number of strokes) of the engine 10. Since explosion occurs once in each cylinder while the engine 10 rotates twice, the window may be set to 720°. In terms of a frequency, because two peaks exist within the window, two explosions while the engine 10 rotates twice may be expressed by 2 Hz. In other words, a primary vibration component (referred to as "C1" in the art) corresponding to the frequency of 2 Hz may be major component of a vibration occurring by explosion of the engine 10. Harmonic components C0.5, C1.5, C2, C2.5, C3, and C3.5 of the primary vibration component may be a cause of the vibration. In this specification, the harmonic components C0.5, C1.5, C2, C2.5, C3, and C3.5 are considered to reduce the vibration, but the present disclosure is not limited thereto. In other words, in order to control the vibration of the engine 10, other harmonic components (e.g., C4, C4.5, C5, and the like) may be further considered.

By performing the WDFT based on the engine speed, the reference angle, and the window, the controller 100 calculates a magnitude spectrum of $M_{C0.5}$ to $M_{C3.5}$ and a phase spectrum of $\theta_{C0.5}$ to $\theta_{C3.5}$ at step S104.

Hereinafter, the WDFT will be described by comparing it with Discrete Fourier Transform (DFT).

The DFT may be used when calculating a frequency spectrum.

When the N number of discrete signals x[n] (n=1, 2, . . . , and N) are given, DFT of x[n] is defined as in Equation 1.

$$X[k] = \sum_{n=1}^{N} X[n]W_N \qquad \text{[Equation 1]}$$

Herein, $W_N = e^{-j2\pi kn/N}$, k is a frequency (k=1, 2, . . . and N). In addition, Equation 1 may be expressed by Equation 2.

$$X[k] = \sum_{n=1}^{N} X[n]e^{-j2\pi kn/N} = \sum_{n=1}^{N} X[n]\left(\cos\frac{2\pi kn}{N} - j\sin\frac{2\pi kn}{N}\right) \qquad \text{[Equation 2]}$$

Herein, $a = \sum_{n=1}^{N} X[n]\cos\frac{2\pi kn}{N}$ and $b = \sum_{n=1}^{N} X[n]\sin\frac{2\pi kn}{N}$.

When analyzing a frequency spectrum of a specific frequency k of an analysis target signal x[n] using the DFT, a magnitude of the specific frequency k is calculated as in Equation 3.

$$\text{Magnitude} = \sqrt{a^2 + b^2} \qquad \text{[Equation 3]}$$

In addition, a phase of the specific frequency k is calculated as in Equation 4.

$$\text{Phase} = \tan^{-1}\frac{b}{a} \qquad \text{[Equation 4]}$$

Upon frequency analyzing a frequency spectrum, when the DFT is used, a calculation load of the controller 100 increases in order to process a triangle function, and a lot of resources of the controller 100 are consumed in order to process continuous signals at a high speed in real time.

Therefore, in order to reduce a calculation load of the controller 100, an apparatus for controlling a vibration of a hybrid electric vehicle according to an exemplary embodiment of the present disclosure may analyze a frequency spectrum using the WDFT.

As shown in FIG. 5, a Walsh function is arranged in an increase order of the zero crossing number per unit time. The Walsh function forms a set with a function of $m=2^n$ (n=1, 2, 3, . . . ). FIG. 5 represent a Walsh function when m=8. The Walsh function is configured with two functions having characteristics of sine wave symmetry and cosine wave symmetry like a Fourier function, and a set of a Walsh function of sine wave symmetry is referred to as a SAL function and a set of a Walsh function of cosine wave symmetry is referred to as a CAL function. In other words, a sine wave component of Equation 2 may be replaced by the SAL function, and a cosine wave component of Equation 2 may be replaced by the CAL function. The WDFT of an analysis target signal x[n] is defined as in Equation 5.

$$X[k] = \sum_{n=1}^{N} X[n]\left(CAL\frac{2\pi kn}{N} - jSAL\frac{2\pi kn}{N}\right) \qquad \text{[Equation 5]}$$

Because the Walsh function has only a value of 1 or −1, frequency spectrum analysis may be performed with simple addition and subtraction.

For example, the WDFT of a frequency of 1 Hz component may be expressed by Equation 6.

$$X[1] = \sum_{n=1}^{N} X[n]\left(CAL\frac{2\pi n}{N} - jSAL\frac{2\pi n}{N}\right) \qquad \text{[Equation 6]}$$

Herein, $$a = \sum_{n=1}^{N/4} X[n] - \sum_{(N/4)+1}^{N/2} X[n] - \sum_{(N/2)+1}^{3N/4} X[n] + \sum_{(3N/4)+1}^{N} X[n]$$

and $$b = \sum_{n=1}^{N/4} X[n] + \sum_{(N/4)+1}^{N/2} X[n] - \sum_{(N/2)+1}^{3N/4} X[n] - \sum_{(3N/4)+1}^{N} X[n].$$

In other words, when analyzing a frequency spectrum of a specific frequency k of an analysis target signal x[n] using WDFT, a magnitude of the specific frequency k is calculated as in Equation 7.

$$\text{Magnitude} = |a| + |b| \qquad \text{[Equation 7]}$$

In addition, a phase of the specific frequency k is calculated as in Equation 8.

$$\text{Phase} = \tan^{-1}\frac{b}{a} \qquad \text{[equation 8]}$$

As shown in FIGS. 6 to 8, it may be verified that a magnitude spectrum and a phase spectrum calculated by performing the DFT and a magnitude spectrum and a phase spectrum calculated by performing the WDFT are substantially similar.

Therefore, in a method of controlling a vibration according to an exemplary embodiment of the present disclosure, a magnitude spectrum and a phase spectrum are calculated by performing the WDFT instead of the DFT. A calculation load of the controller 100 increases in order to calculate a magnitude spectrum and a phase spectrum by performing the DFT, but when performing the WDFT, the controller 100 may quickly calculate the magnitude spectrum and the phase spectrum.

The controller 100 sets a reference spectrum $\text{Ref}_{C0.5}$ to $\text{Ref}_{C3.5}$ based on the engine speed and the engine load at step S105. The controller 100 may calculate the engine speed based on a signal of the engine position detector 91 and calculate the engine load based on a signal of the air amount detector 93. The reference spectrum is a set of reference values $\text{Ref}_{C0.5}$ to $\text{Ref}_{C3.5}$ at each frequency for determining whether to select a specific frequency as a control target frequency. For example, the controller 100 may set the reference spectrum using a map table in which a reference spectrum according to the engine speed and the engine load is set. As shown in FIG. 9, a reference value $\text{Ref}_{C1}$ corresponding to the primary vibration component and a reference value $\text{Ref}_{C2}$ corresponding to the secondary vibration component may be differently set.

The controller 100 compares the reference spectrum and the magnitude spectrum to select a control target frequency at step S106. When a magnitude M corresponding to a specific frequency is greater than a reference value Ref corresponding to the specific frequency, the specific frequency is selected as the control target frequency. As shown in FIG. 9, when a magnitude $M_{C1}$ corresponding to C1 is greater than a reference value $\text{Ref}_{C1}$ corresponding to the C1, the C1 is selected as the control target frequency. When a magnitude $M_{C1}$ corresponding to C2 is equal to or less than a reference value $\text{Ref}_{C2}$ corresponding to the C2, the C2 is not selected as the control target frequency. When a magnitude $M_{C3}$ corresponding to C3 is greater than a reference value $\text{Ref}_{C3}$ corresponding to the C3, the C3 is selected as the control target frequency.

The controller 100 may compensate a magnitude and a phase of the control target frequency at step S107. As described above, because results obtained by performing the WDFT and the DFT are similar but are not the same, the controller 100 may compensate the magnitude of the control target frequency by applying a scale factor $F_{C0.5}$ to $F_{C3.5}$ to the magnitude of the control target frequency. In addition, the controller 100 may compensate the phase of the control target frequency by applying a compensation phase $P_{C0.5}$ to $P_{C3.5}$ to the phase of the control target frequency. The scale factor $F_{C0.5}$ to $F_{C3.5}$ and the compensation phase $P_{C0.5}$ to $P_{C3.5}$ may be previously set by a person of ordinary skill in the art in consideration of the results obtained by performing the WDFT and the DFT. Since the C1 and the C3 are selected as the control target frequency at step S106, a compensated magnitude of C1 becomes $F_{C1} \times M_{C1}$, and a compensated phase thereof becomes $\theta_{C1} + P_{C1}$. In addition, a compensated magnitude of the C3 becomes $F_{C3} \times M_{C3}$, and a compensated phase thereof becomes $\theta_{C3} + P_{C3}$.

The controller 100 performs an Inverse Walsh-based Discrete Fourier Transform (IWDFT) based on a magnitude and a phase of the control target frequency to generate a reference signal $S_y$ at step S108. The IWDFT is known, and thus a detailed description thereof will be omitted.

The controller 100 determines a magnitude ratio $A_y$ of the reference signal based on the engine speed and the engine load at step S109. For example, the controller 100 may determine the magnitude ratio using a map table in which a magnitude ratio according to the engine speed and the engine load is set. A magnitude ratio for reducing a vibration of the engine 10 is previously set in the map table.

By applying the magnitude ratio $A_y$ and the engine torque $T_{Eng}$ to the reference signal $S_y$, the controller 100 calculates a command torque $T_{Mot} = A_y \times S_y \times T_{Eng}$ at step S110.

The controller 100 calculates an inverse phase torque $-T_{Mot}$ of the command torque at step S111. The controller 100 may control operation of the motor 20 to generate the inverse phase torque $-T_{Mot}$ such that the vibration of the engine 10 is controlled.

Meanwhile, the controller 100 may correct the inverse phase torque $-T_{Mot}$ based on an acceleration of the engine 10 at step S112. The controller 100 may calculate the acceleration of the engine 10 by differentiating the engine speed. In detail, as shown in FIG. 10, when the acceleration of the engine is less than a predetermined acceleration, the controller 100 may decrease the inverse phase torque by applying a predetermined offset to the inverse phase torque. The predetermined acceleration may be set to a value which is determined by a person of ordinary skill in the art to determine whether the engine 10 is in a deceleration state. In other words, when the engine 10 is in the deceleration state, the inverse phase torque is decreased and residual energy due to a decrease of the torque is used to charge the battery 50 to improve energy efficiency of the hybrid electric vehicle. The predetermined offset may be set to a value which is determined by a person of ordinary skill in the art based on the acceleration of the engine 10. Accordingly, the controller 100 controls operation of the motor 20 to generate the corrected inverse phase torque such that the vibration of the engine 10 is controlled and energy efficiency of the hybrid electric vehicle is improved.

According to an exemplary embodiment of the present disclosure, as shown in FIG. 11, it may be verified that a magnitude of a control target frequency (e.g., C1 and C3) is reduced.

Hereinafter, a method of controlling a vibration of a hybrid electric vehicle according to another exemplary embodiment of the present disclosure will be described with reference to FIG. 12.

Figure 12:
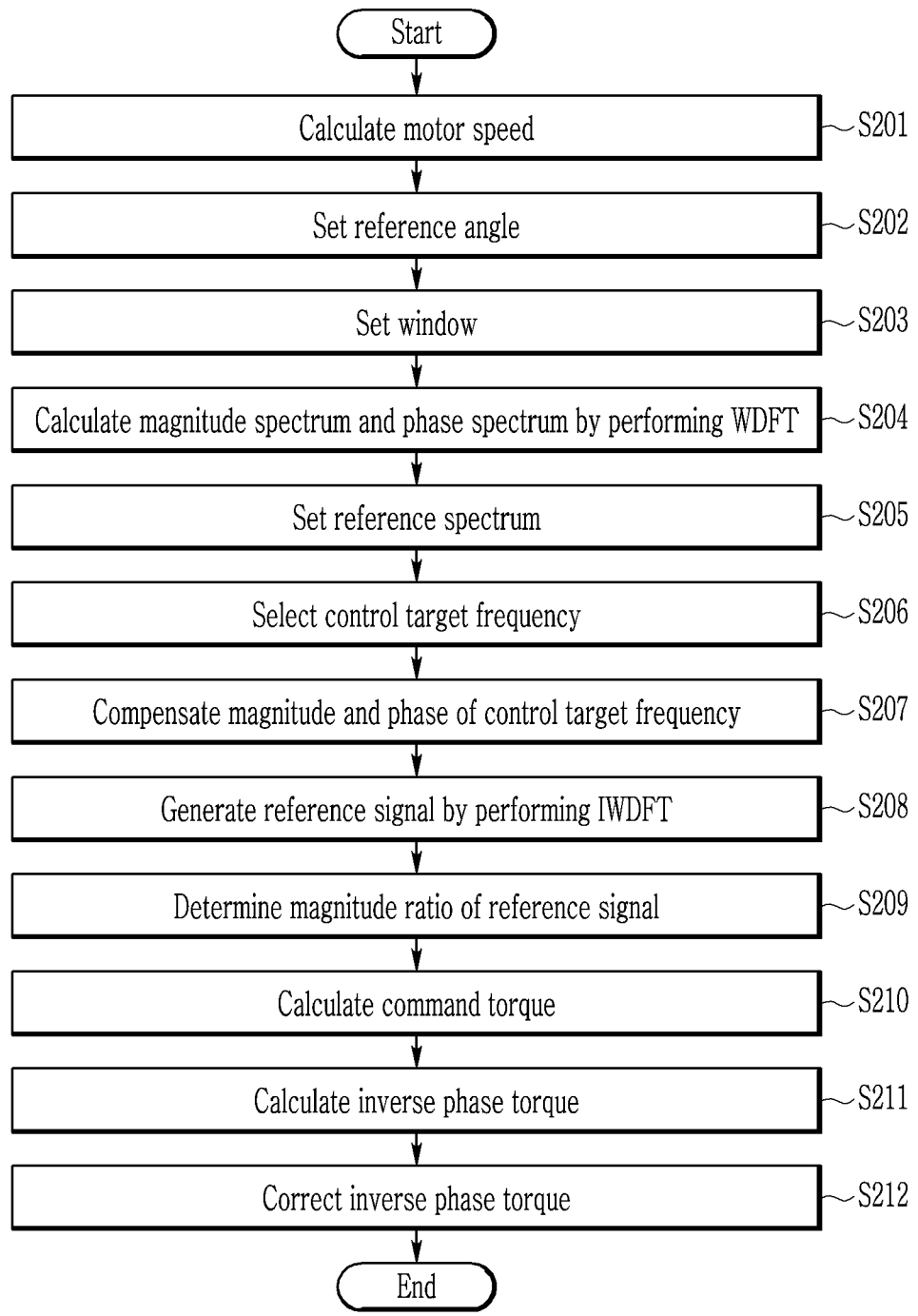
FIG. 12 is a flowchart illustrating a method of controlling a vibration of a hybrid electric vehicle according to another exemplary embodiment of the present disclosure.

FIG. 12 is a flowchart illustrating a method of controlling a vibration of a hybrid electric vehicle according to another exemplary embodiment of the present disclosure.

Referring to FIG. 12, a method of controlling a vibration of a hybrid electric vehicle according to another exemplary embodiment of the present disclosure is similar to a method of controlling a vibration of a hybrid electric vehicle according to an exemplary embodiment of the present disclosure, except for use of a position of the motor 10 instead of a position of the engine 10.

As shown in FIG. 12, the controller 100 calculates a motor speed based on a position of the motor 20 at step S201. The controller 100 may receive a position of the motor 20 detected by the motor position detector 92 and calculate a motor speed by differentiating the position of the motor 20.

The controller 100 sets a reference signal based on the position of the motor 20 at step S202. The controller 100 may divide a signal of the motor position detector 92 according to the number of poles of the motor 20. For example, when the motor 20 is a 16-pole motor, by dividing a signal of the motor position detector 92 into eight, the controller 100 may set a specific time point to the reference angle.

In a state in which the engine 10 is connected to the motor 20 by the engine clutch 30, because the motor 20 rotates according to a rotation of the engine 10, steps S203 to S213 are the same as steps S103 to S113 and therefore a detailed description thereof will be omitted.

As described above, according to an exemplary embodiment of the present disclosure, the calculation load of the controller 100 may be reduced using the WDFT. In addition, by selecting a control target frequency, efficient vibration control may be performed. Further, the inverse phase torque is decreased by applying the predetermined offset to the inverse phase torque when the engine 10 is in the deceleration state, thereby improving energy efficiency of the hybrid electric vehicle.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of controlling a vibration of a hybrid electric vehicle, the method comprising:
    calculating an engine speed based on a position of an engine;
    setting a reference angle based on the position of the engine;
    setting a window for performing Walsh-based Discrete Fourier Transform (WDFT) based on the reference angle;
    calculating a magnitude spectrum and a phase spectrum by performing the WDFT based on the engine speed, the reference angle, and the window;
    selecting a control target frequency based on the magnitude spectrum;
    compensating a magnitude of the control target frequency;
    generating a reference signal based on the magnitude and a phase of the control target frequency;
    determining a magnitude ratio of the reference signal based on the engine speed and an engine load;
    calculating a command torque by applying the magnitude ratio and an engine torque to the reference signal;
    calculating an inverse phase torque of the command torque;
    correcting the inverse phase torque based on an acceleration of the engine when the acceleration of the engine is less than a predetermined acceleration; and
    controlling operation of a motor to generate the corrected inverse phase torque.

2. The method of claim 1, wherein the correcting of the inverse phase torque comprises:
    decreasing the inverse phase torque by applying a predetermined offset to the inverse phase torque when the acceleration of the engine is less than the predetermined acceleration.

3. The method of claim 1, wherein the selecting of the control target frequency comprises:
    setting a reference spectrum based on the engine speed and the engine load; and
    selecting the control target frequency by comparing the reference spectrum and the magnitude spectrum.

4. The method of claim 3, wherein the reference spectrum is a set of reference values at each frequency, and
    a specific frequency is selected as the control target frequency when a magnitude corresponding to the specific frequency is greater than the reference value corresponding to the specific frequency.

5. The method of claim 1, wherein the magnitude of the control target frequency is compensated by applying a scale factor to the control target frequency.

6. The method of claim 1, wherein the generating of the reference signal comprises performing Inverse Walsh-based Discrete Fourier Transform (IWDFT) based on the magnitude and a phase of the control target frequency.

7. The method of claim 1, further comprising compensating the phase of the control target frequency by applying a compensation phase to the phase of the control target frequency.

8. The method of claim 1, wherein the window is determined according to the number of cylinders and the number of strokes of the engine.

9. The method of claim 1, wherein the engine load is calculated based on an air amount flowing into the engine.

10. The method of claim 1, wherein the engine torque is calculated based on a position of an accelerator pedal and a speed of the hybrid electric vehicle.

11. The method of claim 1, wherein the engine is a two-cylinder four-stroke engine.

12. A method of controlling a vibration of a hybrid electric vehicle, the method comprising:
    calculating a motor speed based on a position of a motor;
    setting a reference angle based on the position of the motor;
    setting a window for performing Walsh-based Discrete Fourier Transform (WDFT) based on the reference angle;
    calculating a magnitude spectrum and a phase spectrum by performing the WDFT based on the motor speed, the reference angle, and the window;
    selecting a control target frequency based on the magnitude spectrum;
    compensating a magnitude of the control target frequency by applying a scale factor to the control target frequency;
    generating a reference signal by performing Inverse Walsh-based Discrete Fourier Transform (IWDFT) based on the magnitude and a phase of the control target frequency;
    determining a magnitude ratio of the reference signal based on an engine speed and an engine load;
    calculating a command torque by applying the magnitude ratio and an engine torque to the reference signal;
    calculating an inverse phase torque of the command torque;
    correcting the inverse phase torque based on an acceleration of the engine when the acceleration of the engine is less than a predetermined acceleration; and
    controlling operation of a motor to generate the corrected inverse phase torque.

13. The method of claim 12, wherein the correcting of the inverse phase torque comprises:
    decreasing the inverse phase torque by applying a predetermined offset to the inverse phase torque when the acceleration of the engine is less than the predetermined acceleration.

14. The method of claim 12, wherein the selecting of the control target frequency comprises:
    setting a reference spectrum based on the engine speed and the engine load; and
    selecting the control target frequency by comparing the reference spectrum and the magnitude spectrum.

15. The method of claim 14, wherein the reference spectrum is a set of reference values at each frequency, and
    a specific frequency is selected as the control target frequency when a magnitude corresponding to the specific frequency is greater than the reference value corresponding to the specific frequency.

16. The method of claim 12, further comprising compensating the phase of the control target frequency by applying a compensation phase to the phase of the control target frequency.

17. The method of claim 12, wherein the window is determined according to the number of cylinders and the number of strokes of the engine.

18. The method of claim 12, wherein the engine load is calculated based on an air amount flowing into the engine.

19. The method of claim 12, wherein the engine torque is calculated based on a position of an accelerator pedal and a speed of the hybrid electric vehicle.

20. The method of claim 12, wherein the engine is a two-cylinder four-stroke engine.

* * * * *